(12) United States Patent
Mercille et al.

(10) Patent No.: US 10,795,664 B2
(45) Date of Patent: Oct. 6, 2020

(54) SYSTEMS AND METHODS FOR DIFFERENTIAL BUNDLE UPDATES

(71) Applicant: Walmart Apollo, LLC, Bentonville, AR (US)

(72) Inventors: Richard Mercille, San Jose, CA (US); Benoit Lemaire, San Jose, CA (US); Krunal Shah, Milpitas, CA (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 16/175,705

(22) Filed: Oct. 30, 2018

(65) Prior Publication Data

US 2020/0133656 A1 Apr. 30, 2020

(51) Int. Cl.
*G06F 8/658* (2018.01)
*H04L 29/06* (2006.01)

(52) U.S. Cl.
CPC .............. *G06F 8/658* (2018.02); *H04L 67/42* (2013.01)

(58) Field of Classification Search
CPC ....................................................... G06F 8/658
USPC ......................................................... 717/170
See application file for complete search history.

(56) References Cited

U.S. PATENT DOCUMENTS

| | | | | |
|---|---|---|---|---|
| 8,904,374 B2* | 12/2014 | Nakamura | | G06F 8/66 717/168 |
| 2006/0004756 A1* | 1/2006 | Peleg | | G06F 8/62 |
| 2016/0026452 A1* | 1/2016 | Dani | | G06F 8/65 717/170 |
| 2016/0253170 A1* | 9/2016 | Fardig | | G06F 8/658 717/170 |
| 2018/0349129 A1* | 12/2018 | Ju | | G06F 8/658 |

OTHER PUBLICATIONS

Colin Percival; "Naive Differences of Executable Code"; Daemonology.net website [full url in ref.]; 2003 (Year: 2003).*

* cited by examiner

*Primary Examiner* — Qing Chen
*Assistant Examiner* — Clint Thatcher
(74) *Attorney, Agent, or Firm* — Duane Morris LLP; Manita Rawat

(57) ABSTRACT

In an embodiment, a system includes a processor coupled with a data store, the at least one processor configured to: receive a client product version number from a client device; identify a differential bundle based on a difference between the client product version number and a current product version number, wherein the differential bundle comprises a set of bytewise differences between an executable client product binary file associated with the client product version number and a executable current product binary file associated with the current product version number; determine whether the differential bundle is available in the data store; retrieve the differential bundle from the data store in response to determining that the differential bundle is available in the data store; produce the differential bundle in response to determining that the differential bundle is not available in the data store; and send the differential bundle to the client device.

20 Claims, 6 Drawing Sheets

SYSTEMS AND METHODS FOR DIFFERENTIAL BUNDLE UPDATES

TECHNICAL FIELD

This application relates generally to mobile application ("app") development platforms and, more particularly, relates to systems and methods to support lean over-the-air (OTA) mobile application updates.

BACKGROUND

Many existing mobile applications or apps running on various client devices (e.g., mobile devices, tablets, etc.) have a set of instructions compatible with web-based software components embedded in web applications. Such web-based components may typically be written in mobile application device-independent code such as JavaScript and can run on various types of platforms, processors and/or operating systems (OSes) without modification.

It is often needed or desirable to update a mobile application to incorporate new functionality and/or information by pushing mobile application device-independent code. Such updates may include, for example, application server updates, security updates, user interface upgrades, and the like. For example, for an e-commerce mobile application, updates may be needed to add, delete, or change products, change descriptions, change features, and the like.

This updated mobile application device-independent code may be pulled from a centralized server to various client devices once the updates are finalized and available. However, such updates may consume a significant amount of network resources (e.g., bandwidth) when transmitted. The transmission of the updates may also compete with the typical load of data transmission over the network and cause congestion during the times when such push updates are promulgated to the client devices. It is thus desirable to be able to provide updates for mobile applications without significant consumption of network resources.

The foregoing examples of the related art and limitations related therewith are intended to be illustrative and not exclusive. Other limitations of the related art will become apparent upon a reading of the specification and a study of the drawings.

SUMMARY

The exemplary embodiments disclosed herein are directed to solving the issues relating to one or more of the problems presented in the prior art, as well as providing additional features that will become readily apparent by reference to the following detailed description when taken in conjunction with the accompanied drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In an embodiment, a system includes at least one processor operatively coupled with a data store, the at least one processor configured to: receive a client product version number from a client device; identify a differential bundle based on a difference between the client product version number and a current product version number, wherein the differential bundle comprises a set of bytewise differences between an executable client product binary file associated with the client product version number and a executable current product binary file associated with the current product version number; determine whether the differential bundle is available in the data store; retrieve the differential bundle from the data store in response to determining that the differential bundle is available in the data store; produce the differential bundle in response to determining that the differential bundle is not available in the data store; and send the differential bundle to the client device.

In an embodiment, a system includes: identifying a differential bundle based on a difference between a client product version number and a current product version number, wherein the differential bundle comprises a set of bytewise differences between an executable client product binary file associated with the client product version number and a executable current product binary file associated with the current product version number; determining whether the differential bundle is available in a data store; retrieving the differential bundle from the data store in response to determining that the differential bundle is available in the data store; and producing the differential bundle in response to determining that the differential bundle is not available in the data store.

An embodiment includes a non-transitory computer readable medium having instructions stored thereon. The instructions, when executed by a processor, cause a device to perform operations including: receiving a client product version number; identifying a differential bundle based on a difference between the client product version number and a current product version number, wherein the differential bundle comprises a set of bytewise differences between an executable client product binary file associated with the client product version number and a executable current product binary file associated with the current product version number; determining whether the differential bundle is available in a data store; retrieving the differential bundle from the data store in response to determining that the differential bundle is available in the data store; and producing the differential bundle in response to determining that the differential bundle is not available in the data store.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Figure 1:
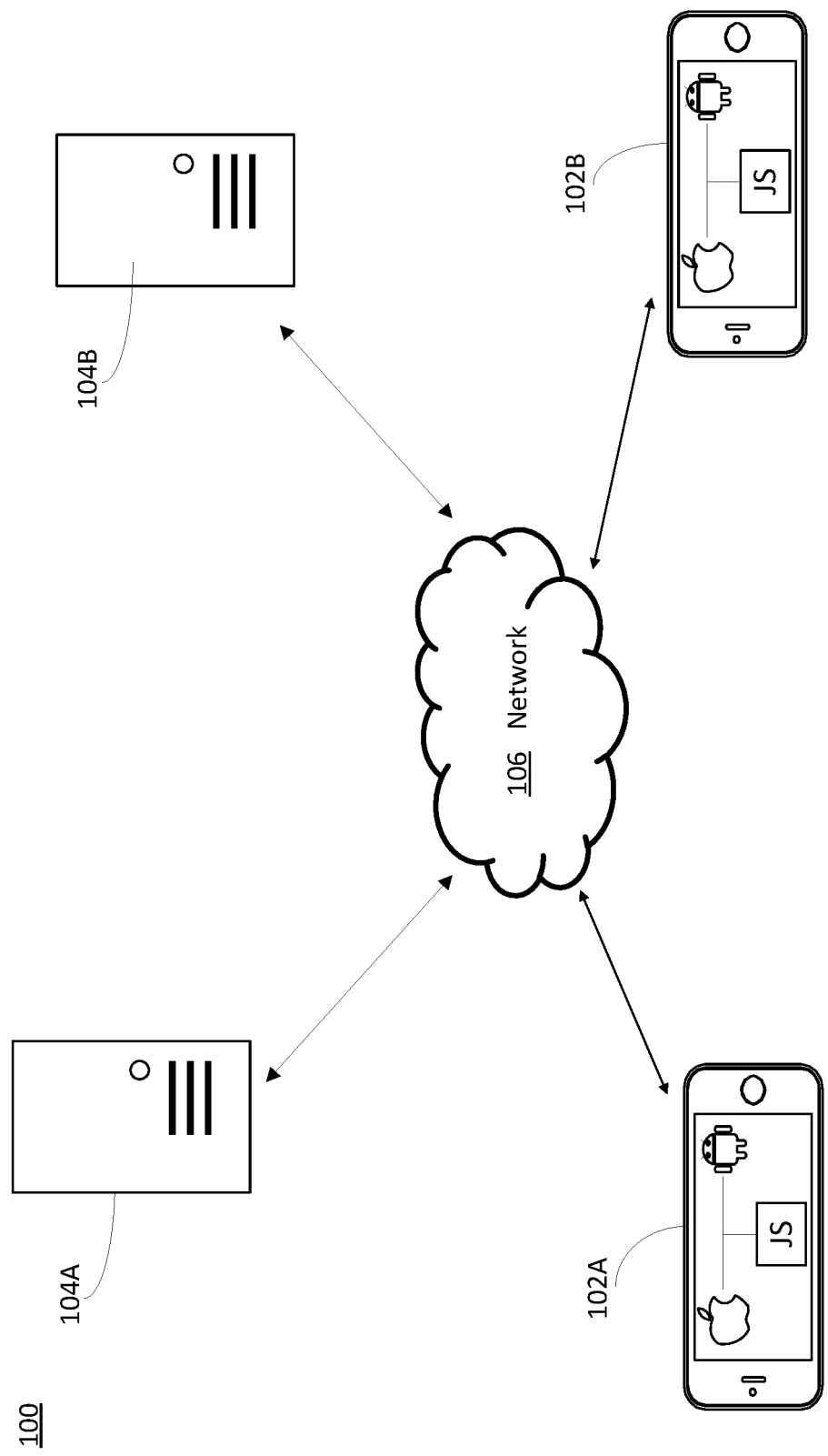
FIG. 1 depicts an example of a system diagram to support differential bundle updates in accordance with some embodiments.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

A new approach is proposed that contemplates systems and methods to support differential bundle updates that minimize usage of network resources. These differential bundle updates may transmit only a differential bundle of differences between mobile application device-independent code of an updated version of a mobile application and the mobile application device-independent code of an outdated version of the mobile application. The mobile application device-independent code of the outdated version of the mobile application may be referred to more simply as the outdated version of the mobile application or as a current client version of a mobile application installed on a client device. This may be in contrast to the mobile application device-independent code of the updated version of the mobile application that is not yet installed on the client device. The mobile application device-independent code of the updated version of the mobile application may be referred to more simply as an updated version of the mobile application. These differences may include or characterize, for example, bytewise differences between the respective executable binary codebases (e.g., the mobile application device-independent code) of the updated version of the mobile application and the current client version of the mobile application running on the client device. The executable binary codebase may be binaries related to an executable part of the mobile application written in a code such as JavaScript. This may contrast with a non-executable binary codebase related to parameters of the web application, such as a selected font, image file, metadata, and/or other data file. Accordingly, this differential bundle may only incorporate essential changes in the executable binary of the updated version of the mobile application that effect an executable aspect of the mobile application when updated. Such a differential bundle may be significantly smaller in size than a full bundle and/or installation package that includes more than just the changes, such as all of the executable and non-executable codebase of the updated version of the mobile application installed on the client device.

In various embodiments, differential bundles may be cached or stored locally in a data store accessible to a server. Retrieving differential bundles from the cache may be less resource intensive than creating a new differential bundle with each request for a differential bundle from a client device. Accordingly, a server that stores differential bundles may process a request for a differential bundle by determining whether the server has a stored version of the requested differential bundle available before embarking on the more resource intensive task of creating the requested differential bundle. Furthermore, when the requested differential bundle is not available in the data store, each newly created requested differential bundle may be stored locally (e.g., cached) in the data store to be retrieved as appropriate to satisfy a future request for the requested differential bundle.

In certain embodiments, a server that supports differential bundles may be backwards compatible and support client devices that do not support the use of differential bundles. Accordingly, each request from a client device may be parsed to determine whether the request includes a flag that indicates whether the client device supports differential bundles. If the client device does not support differential bundles, the server may produce a full bundle and/or package for return to the client device.

In a variety of embodiments, the communications between the client device and the server may be encrypted. For example, the request sent from the client device to the server and the differential bundle communicated from the server to the client device may be encrypted for security and decrypted when received.

In particular embodiments, a client device may periodically send the request to the server for the server to determine whether an updated version of the mobile application is available. Also, the client device may be configured to recreate a full bundle from the differential bundle that represents the full set of updated executables in the updated version of the mobile application. Based on the full bundle, the client device may be able to produce an installation package that packages the executables of the full bundle with the non-executables associated with the mobile application to install the updated version of the mobile application directly on the client device.

In particular embodiments, a client device may run into trouble while installing the updated version of the mobile application based on the differential bundle. For example, the mobile application device-independent code of the updated version of the mobile application may not have been properly installed on the client device due to a failure during the installation process. Based on the failure, or other indication of improper or incomplete installation, the client device may send a failure message to the server indicating that the client device has failed to install the updated version of the mobile application. The server may then note that the particular updated version of the mobile application has incurred a failure and not provide the previously sent differential update to the client device when requested in the future by the client device. Only when a newer update to the mobile application is available (e.g., a newer or more updated version) will the server provide a new differential bundle to the client device. This new differential bundle may then allow the client device to update the mobile application to an even newer version than the version in which installation was previously attempted with failure.

In a number of embodiments, the differential bundle may be created utilizing patching software, such as the bsdiff library for building patches to binary files and the bspatch library for applying patches to binary files. The bsdiff and bspatch libraries are open source software libraries (e.g., tools) that utilize differential bundles as a file containing bytewise differences between the outdated version of the mobile application (e.g., the current client version of the mobile application) and the updated version of the mobile application as well as instructions on how to apply the bytewise differences to a binary file. More specifically, the bsdiff library may build the differential bundle and the bspatch may produce the full bundle based on the differential bundle. Further discussion of the bsdiff and bspatch libraries are provided by Percival, C. (2013) Naive Differences of Executable Code, retrieved from http://www.daemonology.net/papers/bsdiff.pdf, incorporated herein by reference in its entirety.

FIG. 1 depicts an example of a system diagram 100 to support differential bundle updates in accordance with some embodiments. The system diagram 100 includes one or more client devices 102A, 102B such as a mobile device, smart phone, and the like. These client devices 102A, 102B may communicate with one or more servers 104A, 104B over a network 106, such as the Internet. Each of the client devices 102A, 102B and the servers 104A, 104B may include or more computing devices/units/hosts each having software instructions stored in a storage unit such as a non-volatile memory (also referred to as secondary memory) of the computing unit for practicing one or more processes.

The client devices 102A, 102B may each include a mobile application stored in memory and executed using one or more local processors at each respective client device 102A, 102B. The mobile application may be associated with different versions (e.g., identifiers) with incremental values (e.g., version 1, version 2, version 3, and so on) that indicate a particular version number. Typically, a newest version number among all possible mobile application versions may indicate a most updated version of a mobile application. For ease of explanation, reference to a most updated version of the mobile application may be used to distinguish from previous but now outdated updated version(s) of the mobile application in certain exemplary embodiments. However, such identifiers need not be in a particular type of order (e.g., highest to lowest or lowest to highest) so long as a predetermined sequential order may be determined among the identifiers. For ease of discussion, reference to a newest or newer version number may refer to a most updated or more updated version number. As noted above, the mobile application may include an executable binary codebase written in a mobile application device-independent code such as JavaScript. This may contrast with a non-executable binary codebase of the mobile application related to parameters of the web application, such as a selected font, image file, metadata, and/or other data file.

The servers 104A, 104B may include the codebase (e.g., the associated mobile application device-independent code) for each version of the mobile application identifiable by a respective version number or other identifier. As an example with three versions, a first version of a mobile application may be a version 1 and a second more updated version of the first version of the mobile application may be a version 2 of the mobile application and a third updated version of the second version of the mobile application may be a version 3 of the mobile application. Accordingly, each server 104A, 104B may include all three versions of the mobile application in a datastore accessible to each respective server 104A, 104B. Also, each server may produce a differential bundle that updates either the version 1 of the mobile application or the version two of the mobile application to the version 3 of the mobile application, which is the most updated version of the mobile application. The data store may store data as ordered data (e.g., a relational database) or unordered data (e.g., a flat file). In certain embodiments, the data store may be an individual data store local to each server while in other embodiments, the data store may be remote to a particular server, while in yet further embodiments, multiple servers may share a single data store.

Each of the client devices 102A, 102B may be associated with a respective one of the at least one servers 104A, 104B. For example, the client device 102A may be associated with server 104A and client device 102B may be associated with server 104B. As will be discussed further below, each of the client devices may request, and each of the servers may provide to the requesting client device, differential bundle updates.

Figure 2:
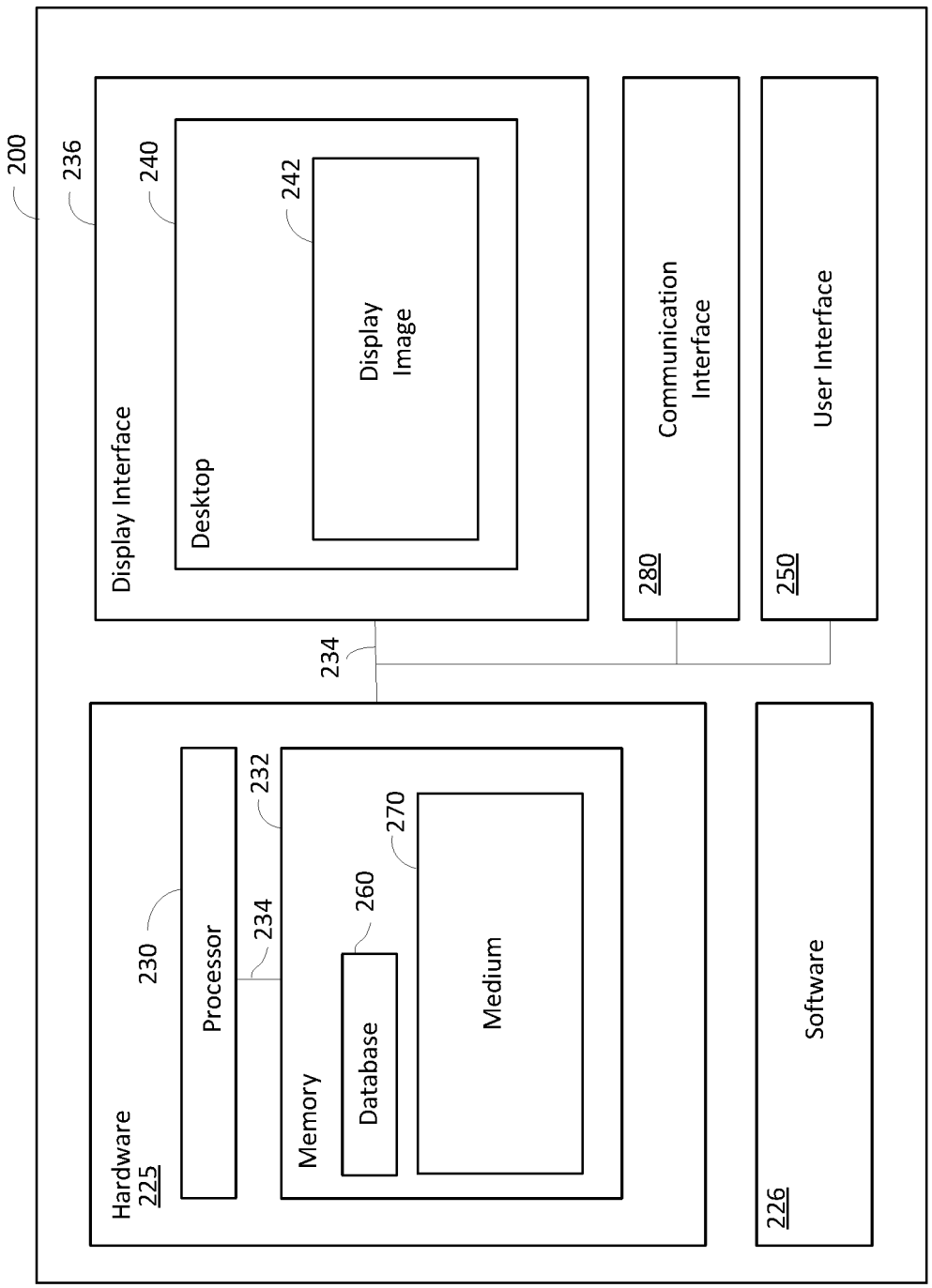
FIG. 2 is a block diagram of an exemplary computing device, in accordance with some embodiments.

FIG. 2 is a block diagram of an example of a computing device 200. As noted above, the computing device 200 may represent exemplary components of a particular client device or server. In some embodiments, the computing device 200 includes a hardware unit 225 and software 226. Software 226 can run on hardware unit 225 (e.g., the processing hardware unit) such that various applications or programs can be executed on hardware unit 225 by way of software 226. In some embodiments, the functions of software 226 can be implemented directly in hardware unit 225 (e.g., as a system-on-a-chip, firmware, field-programmable gate array ("FPGA"), etc.). In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor." Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a few GB of RAM. Memory 232 can also be a ROM, a network interface (MC), and/or other device(s).

In some embodiments, the system bus 234 may couple each of the various system components together. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces. The system bus 234 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, optionally, the computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones). In some embodiments, computing device 200 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, the computing device 200 includes an input or a user interface 250 for receiving input from a user. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

In some embodiments, the computing device 200 can include a database 260 within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage medium 270 (only one being shown in FIG. 2). Computer-readable storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein.

In the example of FIG. 2, the computing device 200 can be a communication device, a storage device, or any device capable of running a software component. For non-limiting examples, the computing device 200 can be but is not limited to a server machine, smartphone, a laptop PC, a desktop PC, a tablet, a Google's Android device, an iPhone, an iPad, and a voice-controlled speaker or controller.

The computing device 200 has a communications interface 280, which enables the computing devices to communicate with each other, the user, and other devices over one or more communication networks following certain communication protocols, such as TCP/IP, http, https, ftp, and sftp protocols. Here, the communication networks can be but are not limited to, internet, intranet, wide area network (WAN), local area network (LAN), wireless network, Bluetooth, WiFi, and mobile communication network.

In some embodiments, the communications interface 280 may include any suitable hardware, software, or combination of hardware and software that is capable of coupling the computing device 200 to one or more networks and/or additional devices. The communications interface 280 may be arranged to operate with any suitable technique for controlling information signals using a desired set of communications protocols, services or operating procedures. The communications interface 280 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 280 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 280 may comprise a wireless interface comprising one or more antennas, transmitters, receivers, transceivers, amplifiers, filters, control logic, and so forth.

In various aspects, the communications interface 280 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

Figure 3:
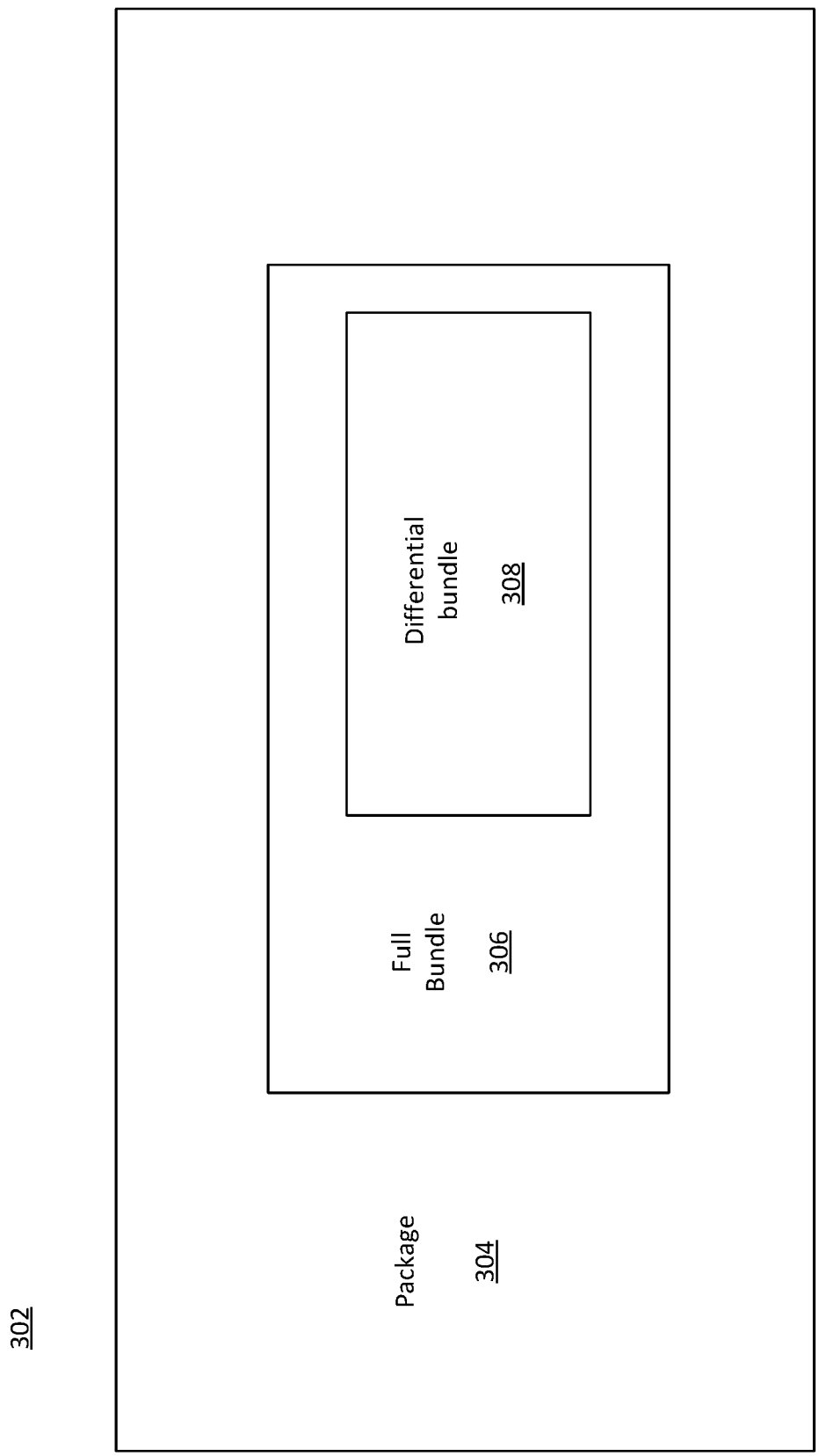
FIG. 3 illustrates a data structure relationship between a package, a full bundle, and a differential bundle, in accordance with some embodiments.

FIG. 3 illustrates a data structure relationship 302 between a package 304, a full bundle 306, and a differential bundle 308, in accordance with some embodiments. As noted above, the differential bundle 308 may be a file containing bytewise differences between the mobile application device-independent code of the outdated version of the mobile application (e.g., the current client version of the mobile application, discussed above) and the mobile application device-independent code of the updated version of the mobile application (e.g., the most updated version of the mobile application, discussed above) and instructions on how to apply the bytewise differences to a binary file. These differences may be limited to differences in executable code, rather than any differences in non-executable code (e.g., data). In particular embodiments, the expression of differences at the granularity of a byte (e.g., bytewise differences) may better distinguish between discrete blocks of executable code (e.g., the mobile application device-independent code) derived from unmodified regions of source code and modified lines of source code than other granularities of measure for digital information. However, although certain embodiments may have a differential bundle characterize differences at the granularity of a byte (e.g., as bytewise differences), the differences between the mobile application device-independent code of the outdated version of the mobile application and the mobile application device-independent code of the updated version of the mobile application may be expressed at any level of granularity as desired for different applications in various embodiments. For example, the differential bundle may express differences at the bit level (e.g., as bitwise differences), kilobyte level (e.g., as kilobyte differences) and/or other units of measure for digital information. In certain embodiments the differential bundle may be compressed for storage and/or transmission, and uncompressed when used to produce a full bundle. In particular embodiments, the differential bundle may be created utilizing patching software, such as the bsdiff library for building patches to binary files and the bspatch library for applying patches to binary files. As noted above, the bsdiff and bspatch libraries are open source software libraries that utilize differential bundles as a file containing bytewise differences between the outdated version of the mobile application and the updated version of the mobile application and instructions on how to apply the bytewise differences to a binary file. More specifically, the bsdiff library may build the differential bundle and the bspatch may produce the full bundle and/or the package for installation based on the differential bundle. In certain embodiments, the differential bundle may represent changes within the source code, such as within JavaScript source code.

Based on the differences between the executable binaries of the differential bundle, a full set of the executable binaries of the updated version of the mobile application may be recreated utilizing the information and instructions included in the differential bundle. The full set of the executable binaries of the updated version may be referred to as a full bundle. As noted above, the bspatch library may be utilized to produce the full bundle from the differential bundle.

Based on the full bundle, a package may be created that includes both the executable binaries (e.g., from the full bundle) and the non-executable binaries (e.g., reflecting data, font selection, pictures, metadata, and the like). The mobile application may be capable of full installation and/or update to the updated version of the mobile application utilizing the full bundle. In certain embodiments where the differential bundle and the full bundle may represent changes within the source code, such as within the JavaScript source code, the parts of the package that are not part of the full bundle may be the parts of the package that are not within the JavaScript source code.

Figure 4:
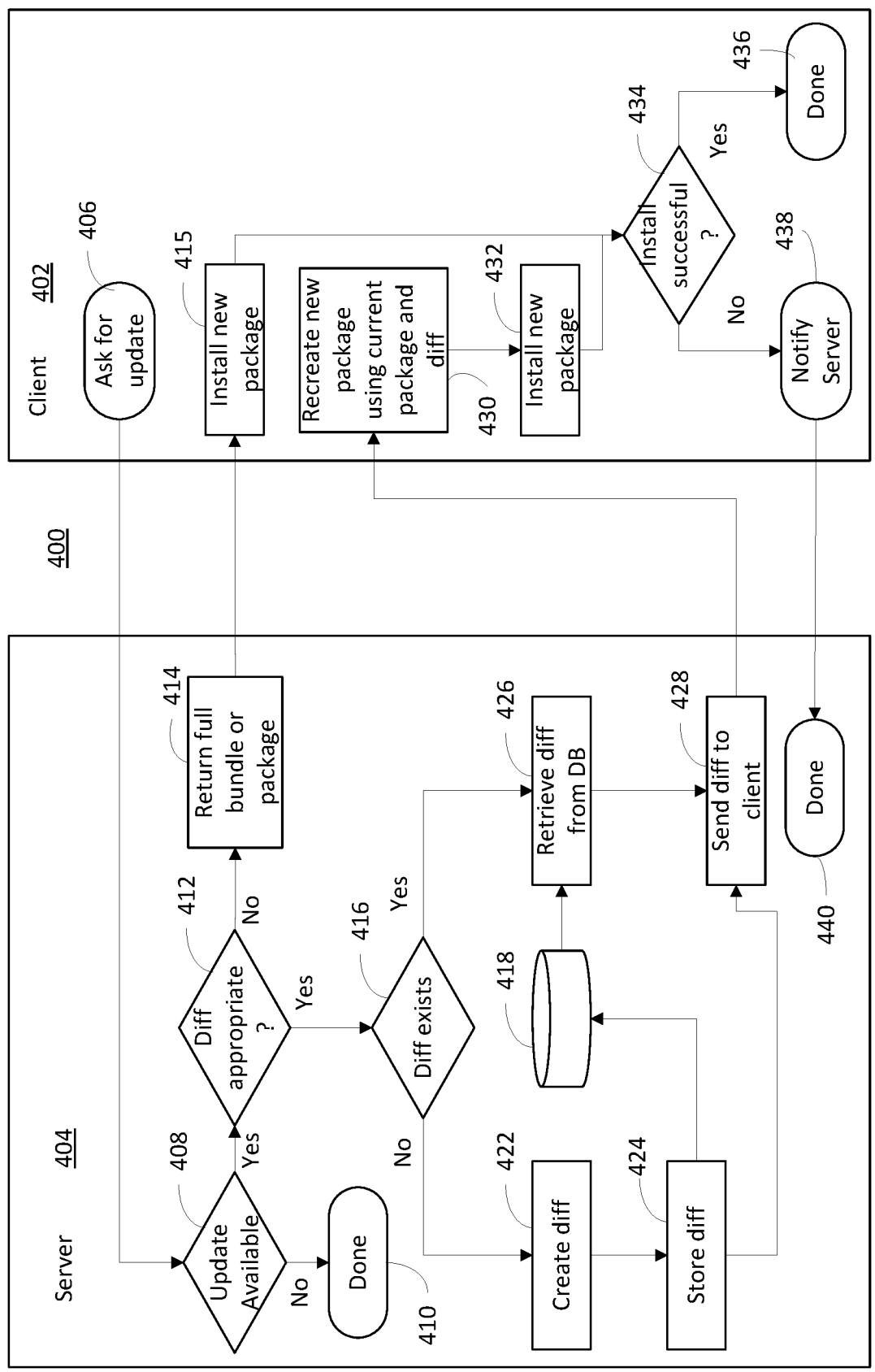
FIG. 4 is a block diagram that illustrates a differential bundle update process, in accordance with some embodiments.

FIG. 4 is a block diagram that illustrates a differential bundle update process 400, in accordance with some embodiments. The process 400 may be performed at a client device 402 and server 404, as introduced above. It is noted that the process 400 is merely an example, and is not intended to limit the present disclosure. Accordingly, it is understood that additional operations may be provided before, during, and after the process 400 of FIG. 4, certain operations may be omitted, certain operations may be performed concurrently with other operations, and that some other operations may only be briefly described herein.

At block 406, the client device may produce a request message for an update to a mobile application. This request message may be produced periodically (e.g., requested with the passage of a particular period of time, such as every week) and/or at certain operational milestones (e.g., based on user interaction with the mobile application). This request message may include an indication of a request to update the mobile application and the version number of the current client version of the mobile application. In certain embodiments, the request message may further include information on the current operating system of the client device and a flag of whether differential updates (e.g., differential bundles) are supported by the client device. In certain embodiments, the flag of whether differential updates (e.g., differential bundles) are supported may be based on the version number of the current client version of the mobile application. In further embodiments, the flag of whether differential updates (e.g., differential bundles) are supported may be expressed directly as the version number of the current client version of the mobile application and not as a flag separate from the version number of the current client version of the mobile application. As noted above, the mobile application device-independent code of the current client version of the mobile application may be an outdated version of the mobile application. However, the client device may not know whether there is an updated version of the mobile application and thus queries the server for an updated version. This request message may be transmitted from the client device to the server over a network, as discussed above. Also, the request message may be encrypted when sent over the network. In certain embodiments, the request message may be transmitted via a wireless connection over the air via a network (e.g., the Internet) to the server 404.

At block 408, the server 404 may parse the request message and determine whether an update is available. The server 404 may determine whether the update is available based on comparing the version number of the current client version of the mobile application (e.g., reflecting the mobile application device-independent code of the current client version of the mobile application) as included in the request message, and a version number of the most updated version of the mobile application (e.g., reflecting the mobile application device-independent code of the most updated version of the mobile application) available to the server 404. As noted above, the version numbers may increment in a predetermined manner so that the server 404 may determine whether there is an updated version of the mobile application as a newest version number for the mobile application.

If there is no update available (e.g., if the version number of the most updated version of the mobile application available to the server 404 is not newer than the current client version of the mobile application), then the process 400 may complete 410 with no update sent to the client device 402. In certain embodiments, the server 404 may send an indication to the client device that there is no update available. In other embodiments, the server 404 may simply not respond to the request message produced in block 406.

In particular embodiments, as will be discussed below, a failed installation of the current most updated version of the mobile application available to the server 404 may communicated to the server 404 from the client device 402. If so, then the server 404 may note that the current most updated version of the mobile application is not available as an update for the client device and the process 400 may also complete 410 with no update sent to the client device 402. Only when there is a new current most updated version of the mobile application (e.g., of an incremented value newer than the past current most updated version of the mobile application, or otherwise indicative of a newer version), then the server will determine that there is an update available to the client device.

If there is an update available (e.g., if the version number of the most updated version of the mobile application available to the server 404 is newer than the current client version of the mobile application), then the process 400 may continue to block 412. At block 412, the server 404 may determine whether it may respond to the request with a differential bundle. As noted above, the server 404 may determine whether the request message does not indicate that the client device supports differential updates using a differential bundle. For example, the request message may include a flag, which may indicate that the client device supports differential updates using a differential bundle or that indicates that the client device does not support differential updates using a differential bundle. If the request message indicates that the client device does not support differential bundles, then the process 400 may proceed to block 414. If the request message indicates that the client device supports differential bundles, then the process 400 may proceed to block 416.

At block 414, the server 404 may produce and send either a full bundle or a package for installation that may configure the client device to update the mobile application to the current newest version of the mobile application. As noted above, the full bundle may be a full set of the executable binaries of the updated version of the mobile application. Also, a package may contain both the executable binaries (e.g., from the full bundle) and the non-executable binaries (e.g., reflecting data, font selection, pictures, metadata, and the like). The client device 402 may be capable of full installation and/or update to the updated version of the mobile application utilizing the full bundle.

At block 415, the client device 402 may install the full bundle or package received from the server 404. In the situation where the client device 402 receives the full bundle, the client device may recreate the package by replacing the previous executable binaries of the outdated current client version mobile application with the full bundle and add the non-executable binaries to produce the package for installation of the most updated version of the mobile application. Then the client device may install the most updated version of the mobile application utilizing the package.

At block 416, the server 404 may determine whether an identified differential bundle already exists within a datastore 418. A differential bundle may be identified as the identified differential bundle that makes up for a difference between the current client version of the mobile application, as included in the request message, and a most updated version of the mobile application available to the server 404. There may be other differential bundles in the datastore 418 between different versions of the mobile application that are not the identified differential bundle. These other differential bundles may that makes up for a difference other than between the current client version and the most updated version of the mobile device. Then, the server 404 may determine whether the identified differential bundle already exists by searching the datastore 418. If the identified differential bundle already exists, then the process 400 may proceed to block 420. If the identified differential bundle does not exist, then the process 400 may proceed to block 422.

At block 422, the server 404 may create the identified differential bundle. As noted above, the identified differential bundle may be a file containing bytewise differences between the outdated version of the mobile application (e.g., the current client version number of the mobile application) and the most updated version number of the mobile application, along with instructions on how to apply the bytewise differences to a binary file. These differences may be limited to differences in executable code, rather than any differences in non-executable code (e.g., data). In particular embodiments, the identified differential bundle may be created utilizing patching software, such as the bsdiff library for building patches to binary files, as noted above.

At block 424, the server 404 may store the identified differential bundle in the datastore 418. By being stored in the datastore, the identified differential bundle may be identified in the datastore and retrieved in a future operation. For example, the identified differential bundle may be indexed as part of the datastore.

At block 426, the server 404 may retrieve the identified differential bundle from the datastore 218. The identified differential bundle may be retrieved by utilizing an identifier associated with the identified differential bundle to identify the identified differential bundle, and then retrieving the identified differential bundle from the datastore 418. As noted above, such an identifier may be specific to (e.g., refer to) the relationship between the current client version of the mobile application, as included in the request message, and the most updated version of the mobile application available to the server 404.

At block 428, the server 404 may send the identified differential bundle to the client device 402. The identified differential bundle may be encrypted during transmission between the server 404 and the client device 402. Also, in certain embodiments, the identified differential bundle may be compressed for transmission to reduce the size of the identified differential bundle during transmission.

At block 430, the client device 402 may recreate the package (e.g., the package for installation of the most updated version of the mobile application) based on the outdated current client version of the mobile application and the identified differential bundle. As noted above, the identified differential bundle may contain the differences between the executable binaries of the outdated version of the mobile application (e.g., the current client version of the mobile application) and the most updated version of the mobile application. Based on the differences between the executable binaries, a full set of the executable binaries of the most updated version of the mobile application (e.g., the full bundle) may be recreated utilizing the information and instructions included in the identified differential bundle. Also, as noted above, the bspatch library may be utilized to produce the full bundle from the identified differential bundle. In certain embodiments, the identified differential bundle and the full bundle may represent changes within the source code, such as within JavaScript source code. Based on the full bundle, a package may be created that includes both the executable binaries (e.g., from the full bundle) and the non-executable binaries (e.g., reflecting data, font selection, pictures, metadata, and the like). In certain embodiments where the identified differential bundle and the full bundle may represent changes within the source code, such as within the JavaScript source code, the parts of the package that are not part of the full bundle may be the parts of the package that are not within the JavaScript source code.

At block 432, the client device 402 may install the package. The client device 402, utilizing the package, may be capable of full installation to update the mobile application to the most updated version of the mobile application.

At block 434, a decision may be made as to whether the installation was successful. The installation may not be successful when there is an error that occurs (e.g., is experienced) during the installation or if the installation fails to complete. If the installation fails to complete, then the current updated version of the mobile application may not be installed on the client device 402. If the installation was successful, the process 400 may proceed to block 436 and be complete. If the installation was not successful, the process 400 may proceed to block 438.

At block 438, the failed installation of the current newest version number of the mobile application may communicated to the server from the client device. This may be communicated utilizing a failure message produced by the client device 402 and sent to the server 404. The failure message may be encrypted during transit from the client device 402 to the server 404.

At block 440, the server 404 may note that the current most updated version of the mobile application is not available as an update for the client device based on the received failure message. Only when there is a new most updated version of the mobile application, then the server will determine that there is an update available to the client device. This is discussed further with reference to the above discussion of block 408. Then, the process 400 may complete.

Figure 5:
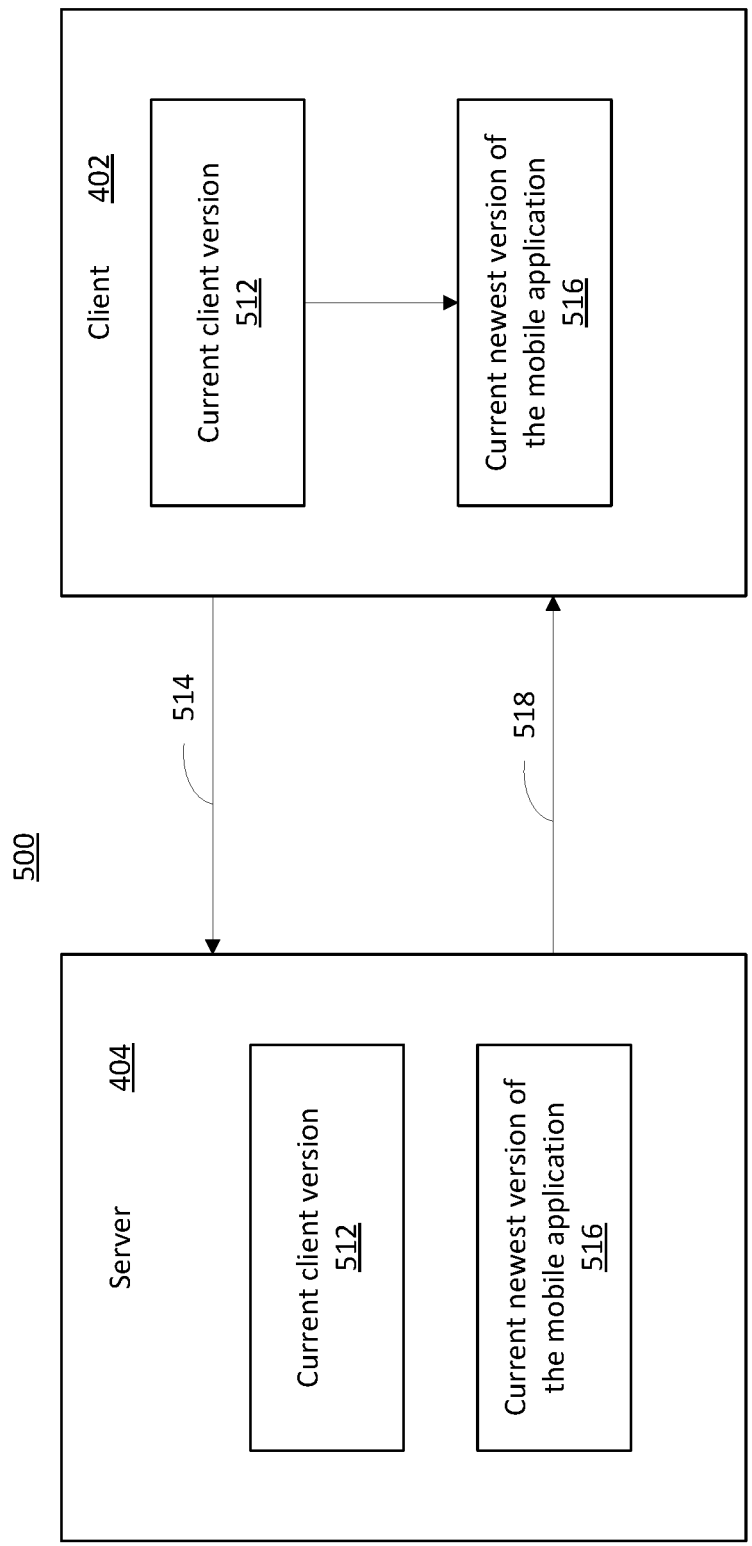
FIG. 5 is a block diagram that illustrates a client device and server relationship when differential bundle updates are not supported, in accordance with some embodiments.

FIG. 5 is a block diagram 500 that illustrates a client device 402 and server 404 relationship when differential bundle updates are not supported, in accordance with some embodiments. The client device 402 may include a current client version of a mobile application 512. The current client version of the mobile application 512 may include the full codebase or the full set of binaries of the current client version of the mobile application 512. For example, the current client version of the mobile application 512 may be version 2 of the mobile application.

As discussed above, the client device 402 may produce and send a request message 514 for an update to the current client version of the mobile application 512. This request message may include an indication of a request to update the mobile application, the version number of the current client version of the mobile application and a flag of whether differential updates (e.g., differential bundles) are supported by the client device 402. In certain embodiments, the flag of whether differential updates (e.g., differential bundles) are supported may be based on the version number of the current client version of the mobile application. In further embodiments, the flag of whether differential updates (e.g., differential bundles) are supported may be directly expressed as the version number of the current client version of the mobile application and not as a separate flag that is separate from the version number of the current client version of the mobile application. In the example of FIG. 5, the request message may indicate that differential updates are not supported by the client device 402.

The server 404 may parse the request message 514 and determine whether an update is available. The server 404 may determine whether the update is available based on comparing the current client version number of the mobile application, as included in the request message, and a version number of the most updated version of the mobile application 516 available to the server 404. Based on the request message 514, the server 404 may also determine whether it may respond to the request with a differential bundle. As the request message indicates that the client device does not support differential bundles, the server 404 may produce and send either a full bundle or a package 518 for installation that may configure the client device 402 to update the mobile application to the most updated version of the mobile application 516. As noted above, the full bundle may be a full set of the executable binaries of the updated version of the mobile application. Also, a package may contain both the executable binaries (e.g., from the full bundle) and the non-executable binaries (e.g., reflecting data, font selection, pictures, metadata, and the like). When a package is received from the server 404, the client device 402 may install the most updated version of the mobile application utilizing the received package.

In the situation where the client device 402 receives the full bundle, the client device 402 may recreate the package by replacing the previous executable binaries of the outdated current client version of the mobile application with the full bundle and add the non-executable binaries to produce the package for installation of the most updated version of the mobile application. Then the client device 402 may install the most updated version of the mobile application utilizing the recreated package.

Figure 6:
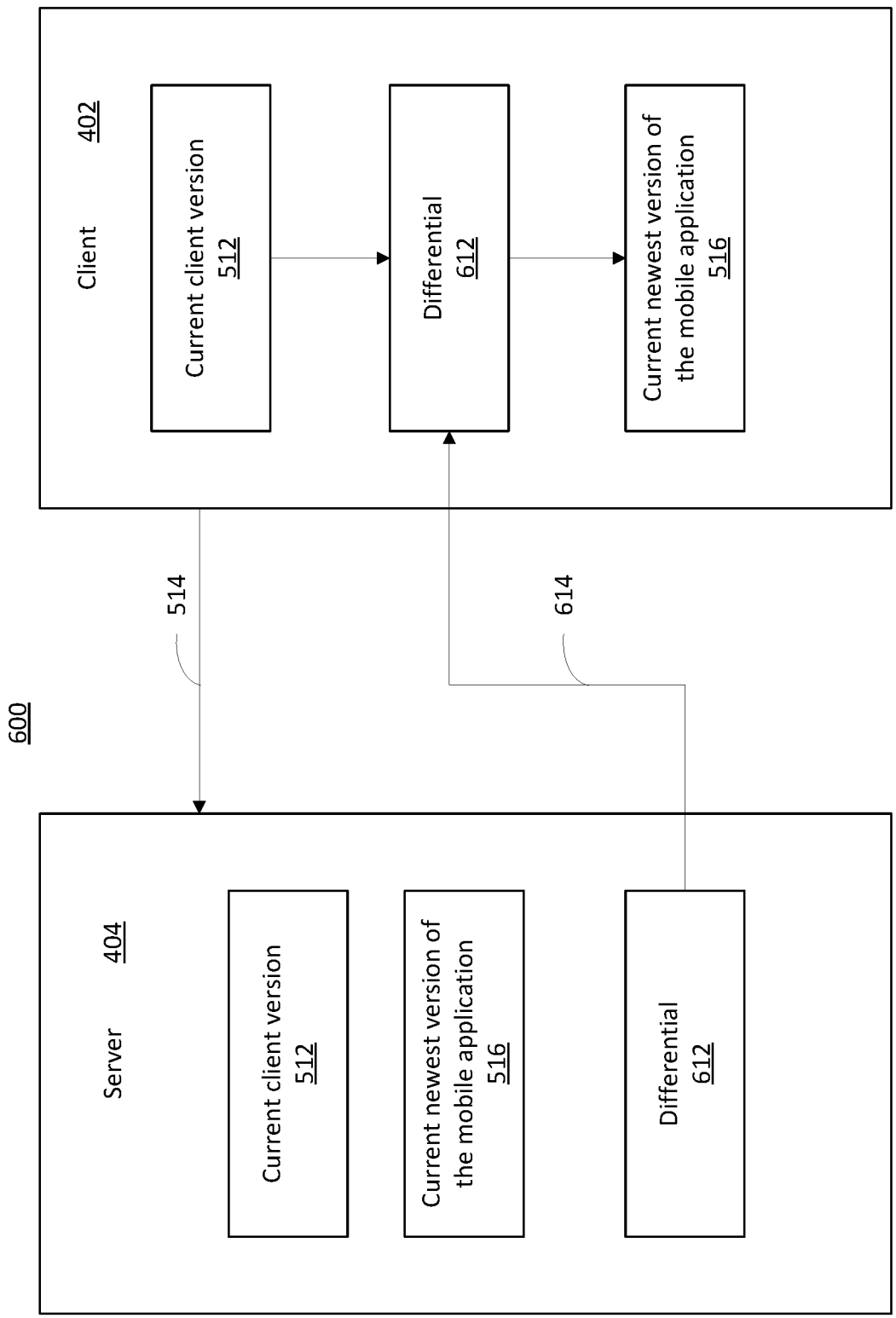
FIG. 6 is a block diagram that illustrates a client device and server relationship when differential bundle updates are supported, in accordance with some embodiments.

FIG. 6 is a block diagram that illustrates a client device 402 and server 404 relationship when differential bundle updates are supported, in accordance with some embodiments. As noted above, the client device 402 may include a current client version of a mobile application 512. Also, the client device 402 may produce and send a request message 514 for an update to the current client version of the mobile application 512. This request message may include an indication of a request to update the mobile application, the version number of the current client version of the mobile application and a flag of whether differential updates (e.g., differential bundles) are supported by the client device 402. In certain embodiments, the flag of whether differential updates (e.g., differential bundles) are supported may be based on the version number of the current client version of the mobile application. In further embodiments, the flag of whether differential updates (e.g., differential bundles) are supported may be expressed directly as the version number of the current client version of the mobile application and not as a separate flag that is separate from the version number of the current client version of the mobile application. In the example of FIG. 5, the request message may indicate that differential updates are supported by the client device 402.

The server 404 may parse the request message 514 and determine whether an update is available. The server 404 may determine whether the update is available based on comparing the current client version number of the mobile application, as included in the request message, and a version number of the most updated version of the mobile application 516 available to the server 404. Based on the request message 514, the server 404 may also determine that it may respond to the request with a identified differential bundle 612. As noted above, the differential bundle in the response may be an identified differential bundle that makes up for a difference between the current client version of the mobile application 512 and the most updated version of the mobile application 516 available to the server 404.

The server 404 may determine whether the identified differential bundle 612 may be retrieved from a datastore. If the identified differential bundle is not retrievable from the datastore, then the server 404 may produce the identified differential bundle 612 and also store the identified differential bundle in the datastore for future retrieval. In any event, once procured, the identified differential bundle 614 may be sent to the client device 402.

The client device 402 may then recreate the package (e.g., the package for installation of the most updated version of the mobile application) based on the outdated current client version of the mobile application 512 and the identified differential bundle 612. Then, the client device 402 may install the most updated version of the mobile application 516 using the package.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A system, comprising:
    at least one processor operatively coupled with a data store, the at least one processor configured to:
        receive a request message from a client device, wherein the request message identifies a client product version number and a differential update indication;
        determine whether the client device supports differential updates based on the differential update indication;
        when differential updates are supported:
            identify a differential bundle based on a difference between the client product version number and a current product version number, wherein the differential bundle comprises a set of bytewise differences between an executable client product binary file associated with the client product version number and a executable current product binary file associated with the current product version number;
            determine whether the differential bundle is available in the data store;
            retrieve the differential bundle from the data store in response to determining that the differential bundle is available in the data store;
            produce the differential bundle in response to determining that the differential bundle is not available in the data store; and
            send the differential bundle to the client device; and
        when differential updates are not supported, send a full bundle to the client device, wherein the full bundle comprises the executable current product binary file.

2. The system of claim 1, wherein the client device is configured to:
    produce an updated executable client product binary file in response to receiving the differential bundle, wherein the updated executable client product binary file is produced by updating the executable client product binary file that is stored at the client device based on the set of bytewise differences;
    produce an updated package based on the updated executable client product binary file, wherein the updated package comprises the updated executable client product binary file and non-executable files; and
    installing the updated package on the client device.

3. The system of claim 2, wherein the client device is configured to produce the updated executable client product binary file based on a bspatch library.

4. The system of claim 1, wherein the at least one processor is further configured to produce the differential bundle based on a bsdiff library.

5. The system of claim 1, wherein the executable client product binary file and the executable current product binary file are both associated with JavaScript code.

6. The system of claim 1, wherein the at least one processor is further configured to store the differential bundle in the data store in response to determining that the differential bundle is not available in the data store.

7. The system of claim 1, wherein the data store comprises the executable client product binary file and the executable current product binary file.

8. The system of claim 1, wherein the set of bytewise differences is compressed.

9. The system of claim 1, wherein the request message further indicates an operating system.

10. The system of claim 9, wherein the at least one processor is configured to identify the differential bundle based on whether the request message indicates that differential bundles are supported by the client device.

11. A method, comprising:
    receiving a request message that identifies a client product version number and a differential update indication;
    determining whether differential updates are supported based on the differential update indication;
    when differential updates are supported:
        identifying a differential bundle based on a difference between a client product version number and a current product version number, wherein the differential bundle comprises a set of bytewise differences between an executable client product binary file associated with the client product version number and a executable current product binary file associated with the current product version number;
        determining whether the differential bundle is available in a data store;
        retrieving the differential bundle from the data store in response to determining that the differential bundle is available in the data store;
        producing the differential bundle in response to determining that the differential bundle is not available in the data store; and
        sending the differential bundle; and
    when differential updates are not supported, sending a full bundle, wherein the full bundle comprises the executable current product binary file.

12. The method of claim 11, further comprising:
producing an updated executable client product binary file by updating the executable client product binary file based on the set of bytewise differences;
producing an updated package based on the updated executable client product binary file, wherein the updated package comprises the updated executable client product binary file and non-executable files; and
installing the updated package.

13. The method of claim 12, further comprising:
receiving the client product version number from a server; and
installing the updated package on a client device.

14. The method of claim 12, further comprising:
sending an indication that the updated package cannot be installed based on an error experienced during installation of the updated package.

15. The method of claim 11, further comprising:
receiving the client product version number from a client device; and
sending the differential bundle to the client device.

16. A non-transitory computer readable medium having instructions stored thereon, wherein the instructions, when executed by a processor, cause a device to perform operations comprising:
receiving a request message that identifies a client product version number and a differential update indication;
determining whether differential updates are supported based on the differential update indication;
when differential updates are supported:
identifying a differential bundle based on a difference between the client product version number and a current product version number, wherein the differential bundle comprises a set of bytewise differences between an executable client product binary file associated with the client product version number and a executable current product binary file associated with the current product version number;
determining whether the differential bundle is available in a data store;
retrieving the differential bundle from the data store in response to determining that the differential bundle is available in the data store;
producing the differential bundle in response to determining that the differential bundle is not available in the data store; and
sending the differential bundle; and
when differential updates are not supported, sending a full bundle, wherein the full bundle comprises the executable current product binary file.

17. The non-transitory computer readable medium of claim 16, wherein the operations comprise:
encrypting the differential bundle; and
sending the differential bundle as encrypted.

18. The non-transitory computer readable medium of claim 16, wherein the client product version number is part of an encrypted file.

19. The non-transitory computer readable medium of claim 16, wherein the executable client product binary file and the executable current product binary file are both associated with JavaScript code.

20. The non-transitory computer readable medium of claim 16, wherein, the operations comprise storing the differential bundle in the data store in response to determining that the differential bundle is not available in the data store.

* * * * *